US012789972B2

(12) United States Patent
Devillez et al.

(10) Patent No.: US 12,789,972 B2
(45) Date of Patent: Nov. 10, 2026

(54) INTERFACE BETWEEN THE INTERIOR OPENING HANDLE OF AN AIRCRAFT DOOR AND AN ELECTRICAL SYSTEM FOR EMERGENCY OPENING ASSISTANCE

(71) Applicant: LATECOERE, Toulouse (FR)

(72) Inventors: Sébastien Devillez, Saint Jean (FR); Sébastien Mougenot, Graulhet (FR); Paul Ferlac, Toulouse (FR); Mathieu Darcas, Toulouse (FR)

(73) Assignee: LATECOERE, Toulouse (FR)

( * ) Notice: Subject to any disclaimer, the term of this patent is extended or adjusted under 35 U.S.C. 154(b) by 0 days.

(21) Appl. No.: 19/131,623

(22) PCT Filed: Nov. 10, 2023

(86) PCT No.: PCT/EP2023/081389

§ 371 (c)(1),
(2) Date: May 21, 2025

(87) PCT Pub. No.: WO2024/110211

PCT Pub. Date: May 30, 2024

(65) Prior Publication Data

US 2026/0192909 A1 Jul. 9, 2026

(30) Foreign Application Priority Data

Nov. 22, 2022 (FR) ...................................... 2212172

(51) Int. Cl.
*B64C 1/14* (2006.01)

(52) U.S. Cl.
CPC ................................. *B64C 1/1423* (2013.01)

(58) Field of Classification Search
CPC .......... E05B 77/04; E05B 77/54; E05B 81/74; Y10T 292/1082; Y10T 292/11; B64C 1/1423
See application file for complete search history.

(56) References Cited

U.S. PATENT DOCUMENTS 4,125,235 A 11/1978 Fitzgerald
5,305,969 A * 4/1994 Odell .................... B64C 1/1407
292/259 R (Continued)

FOREIGN PATENT DOCUMENTS

FR 3117088 6/2022
WO WO-2024115363 A1 * 6/2024 ........... B64C 1/1423
WO WO-2025223925 A1 * 10/2025 ........... B64C 1/1461

*Primary Examiner* — Christine M Mills
*Assistant Examiner* — Yahya Sidky
(74) *Attorney, Agent, or Firm* — Defillo & Associates, Inc; Evelyn A. Defillo

(57) ABSTRACT

A mechanical interface between an interior actuating handle ensuring the opening of an aircraft door and a reserve of electrical energy for assisting the door emergency opening. The interface having an arming handle movable between an armed and a disarmed positions and coupled to the interior actuating handle by a transmission mechanism including a first lever connected to the arming handle and to a shaft carrying a second lever supporting a rod and a clutch in rotation with the second lever and the first lever and a cam mounted on the shaft and cooperating with a driving element carried by the actuating handle. When the arming handle is in the armed position, a pre-rotation of the actuating handle at an angle between 3° and 50° from its rest position along with the rotation of the cam, pivoting the second lever, translational movement of the rod, and activation of the reserve of electrical energy.

13 Claims, 5 Drawing Sheets

(56) References Cited

U.S. PATENT DOCUMENTS

| | | | | |
|---|---|---|---|---|
| 5,337,977 | A | 8/1994 | Fleming | |
| 2020/0181948 | A1* | 6/2020 | Savidge | B64C 1/1407 |
| 2024/0025530 | A1* | 1/2024 | Devillez | B64C 1/1423 |

* cited by examiner

INTERFACE BETWEEN THE INTERIOR OPENING HANDLE OF AN AIRCRAFT DOOR AND AN ELECTRICAL SYSTEM FOR EMERGENCY OPENING ASSISTANCE

TECHNICAL FIELD

The invention relates to the field of aeronautics and, more specifically, to the safety devices integrated into the architecture of an aircraft door.

Generally speaking, such a door comprises, in particular, an arming handle for a reversible activation of the safety system and a main opening mechanism comprising internal and external operating handles.

The resistance of the door to the difference of pressure between the inside and outside of the aircraft cabin is achieved by means of stops installed around the edges of the sash and its frame. The operating handles primarily ensure the release of these stops and the movement of the door to its fully open position.

In critical emergency situations (risk of fire, unsafe landing, serious technical problem, etc.), the door must be able to be opened quickly in a single operation.

However, due to the operational requirements for the flight crew, the forces exerted, in normal situations, on the door operating handle for its opening or closing must be limited. However, in an emergency situation, efforts increase following the collapse of a landing gear and the activation of the slide. This increase effort during opening prevents regular crew from opening the door without the help of assistance devices.

Under these conditions, aircraft doors are generally equipped with a safety system providing assistance with opening and comprising, either a hydro-pneumatic system where the emergency power source consists of a compressed air bottle, or in some aircraft, an electrical system comprising, in particular, motors and actuators powered by a power source which guarantee an appropriate supply of mechanical power to guide and move the door according to a pre-established kinematic. This electrical safety system is usually automatically activated in an emergency situation.

In a conventional aircraft door, the arming handle allows the emergency system to be activated or deactivated. By putting this handle in the "armed" position, the operator activates the safety system and puts in place the lever that will activate the door opening actuator at the end of the release of the stops. Of course, moving the arming handle to the opposite ("disarmed") position will cause the reverse actions.

However, in the current configuration of the door, the activation of an electrical safety system is problematic for the following reasons.

The door is in fact not one of the flight systems considered essential and, therefore, for energy-saving reasons, it is cut off from its power supply in the event of an engine failure of the aircraft. In this case, depending on the ETOPS (Extended-range Twin-engine Operations Performance Standards) rating of the aircraft, a more or less long flight may result (the current maximum duration being 370 minutes).

In this case, if current loss detection is used to activate the emergency electrical circuit, it is then necessary to oversize the capacity of the power source. It would be possible to activate the electrical energy reserve only at the same time as the door is opened, which would reduce electricity consumption. However, this solution is likely to cause a latency time and therefore a delay in opening, which is detrimental to security. This latency problem is also more severe if the slide is unlocked by means of an electric actuator when opening from the outside.

In this context, the invention aims to find a solution to solve the technical problems posed by previous safety systems by providing a mechanical interface ensuring the prior activation of the electrical power reserve by a simple operation of the inner actuating handle.

In order to be compatible with the time sequencing requirements, this activation occurs by rotating the handle from its initial position. Thus, according to the invention, a predetermined angle value of the inner handle (or the outer handle) in relation to its closing position ensures that the door is supplied with electrical energy and that the emergency safety system will then be available at the slightest request.

This purpose is achieved, according to the invention, by means of a mechanical interface between an inner actuating handle ensuring, by rotation around an axis, the opening of an aircraft door and a reserve of electrical energy intended to assist in the emergency opening of the door, said interface comprising, in particular, a movable arming handle between an armed and a disarmed position and which is coupled to the inner actuating handle by means of a transmission, characterized in that said transmission mechanism comprises:

- a first lever connected, at one end, to the arming handle and, at its other end, to a shaft carrying a second free lever to which is attached a rod for activating the safety electrical energy reserve and a clutch element cooperating in rotation with the said first and second levers and,
- a cam mounted on said shaft and cooperating with a drive element carried by the actuating handle capable of performing, in the armed position of the arming handle, a prior rotation of the actuating handle at an angle between 3° and 50° from its resting position jointly causes the rotation of the cam, the pivoting of the second free lever, the translation of the rod and the activation of the electrical energy reserve.

According to an advantageous feature of the invention interface, the cam is coupled to a return spring which is under tension. In the disarmed position, the tension is minimal and is increased a first-time during arming and then again, a second time when the main handle is operated.

According to another advantageous feature is that the first lever is mounted in free rotation on the shaft.

According to yet another feature of the interface of the invention, the second lever is mounted in free rotation on the shaft between the clutch element and the first lever.

In addition, the invention provides that the clutch element is attached to the cam via the support shaft which is parallel to the axis of the actuating handle.

According to a specific embodiment of the interface of the invention, the clutch element carries a first finger and a second finger, the first finger being driven by the second lever and positioned so as to come into abutment against the second lever in the armed position of the handle, while the second finger is positioned on the clutch element so as to come into abutment against the first lever from the disarmed position to the arming handle and vice versa under the action of the spring. The second finger thus moves the second lever to the armed position, which activates the electrical energy reserve.

According to another particular variant embodiment of the interface of the invention, the drive element carried by the actuating handle is formed by a pin and the cam is formed by a ramp arrange opposite the pin.

According to an advantageous feature of the invention, the drive element and said cam are positioned in relation to each other in such a way that when the arming handle is in the armed position, the rotation of the actuating handle causes the cam and the second lever to rotate jointly via the shaft and clutch element via the drive element.

Conversely, the invention provides that the drive element and said cam are positioned relative to each other so that when the arming handle is in the disarmed position, the rotation of the actuating handle is free and the cam remains fixed.

In addition, the invention provides that the arming handle is connected to the connecting arm by a set of connecting rods.

Therefore, thanks to the interface of the invention, the activation of the energy reserve is ensured, in the armed position, by pulling the rod under the simple action of the cam and thus of the main actuating handle. Another object of the invention is an aircraft door provided with at least one handle for operating the opening from the inside or outside and a safety system comprising an electrical power reserve, said door being equipped with a mechanical interface as defined above.

The interface of the invention allows the use of an electrical architecture for doors with a side release of the stops and the advantages associated therewith, namely, the pooling of the energy of the emergency systems and the device for deploying and inflating the slide and the so-called “swivelling” motor, The invention relating to the provision of the reserve of electrical energy in the event of an emergency opening, it may also be applied to any type of door. In these other applications, it will be sufficient to keep the same arrangement in front of the axis of the handle.

PRESENTATION OF THE FIGURES

Other features and advantages of the invention will be apparent from the following non-limiting description, with reference to the attached drawings in which:

FIG. 1 is a side-view overview of a preferred embodiment of the mechanical interface of the invention in the disarmed position with the actuating handle in the resting position.

FIG. 2 a side-view overview of the mechanical interface in FIG. 1 in the armed position with the actuating handle in the resting position.

For greater clarity, identical or similar elements are indicated by identical reference signs in the following description and on the figures. Of course, the embodiments of the invention illustrated schematically by the figures presented above and described below are given only as non-limiting examples. It is explicitly provided in the context of the invention that different modes may be proposed and combined with each other in order to propose others.

DETAILED DESCRIPTION

The invention relates to aircraft doors and particularly to systems for triggering the electrical energy necessary to open these doors in an emergency situation.

Figure 1:
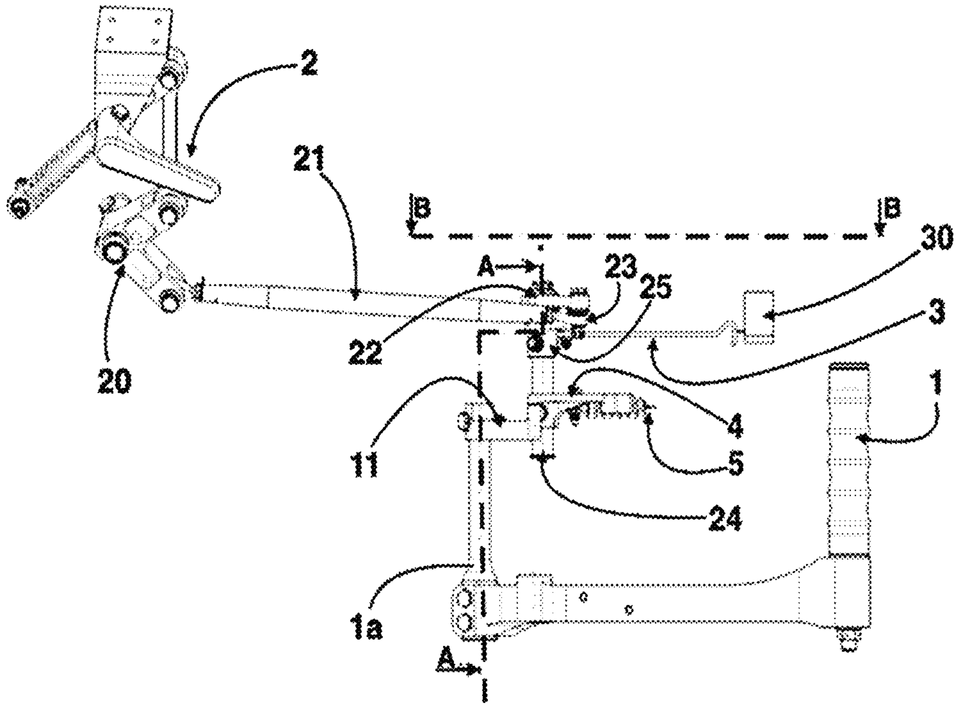
Figure 2:
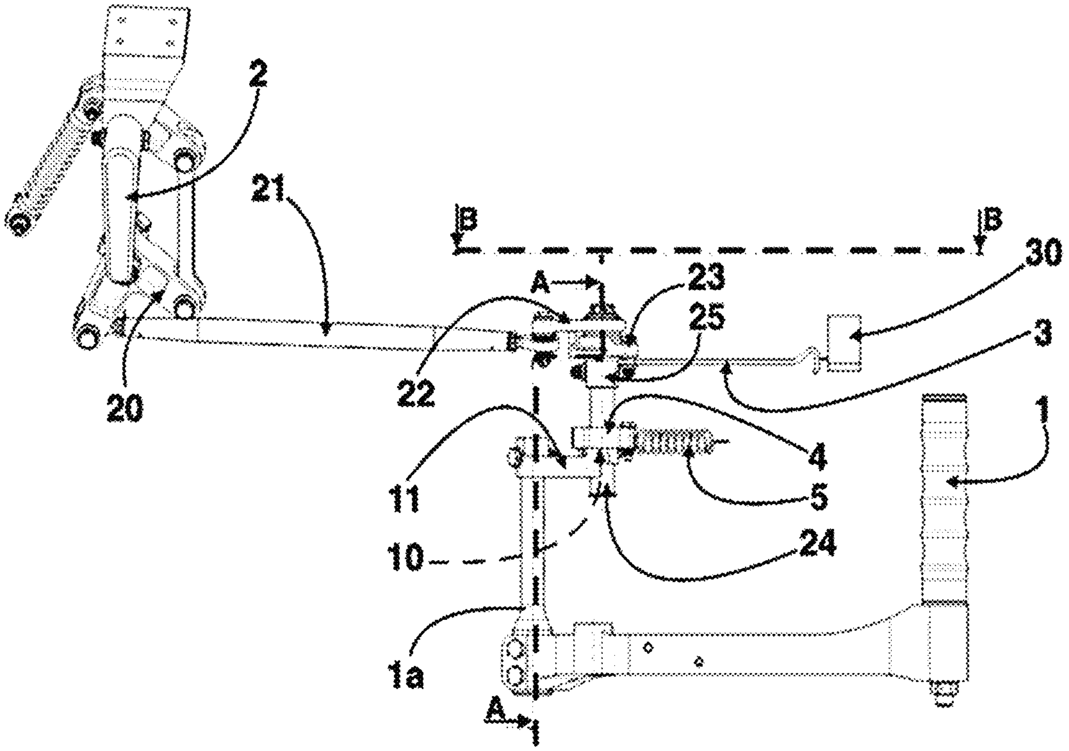
Figure 3:
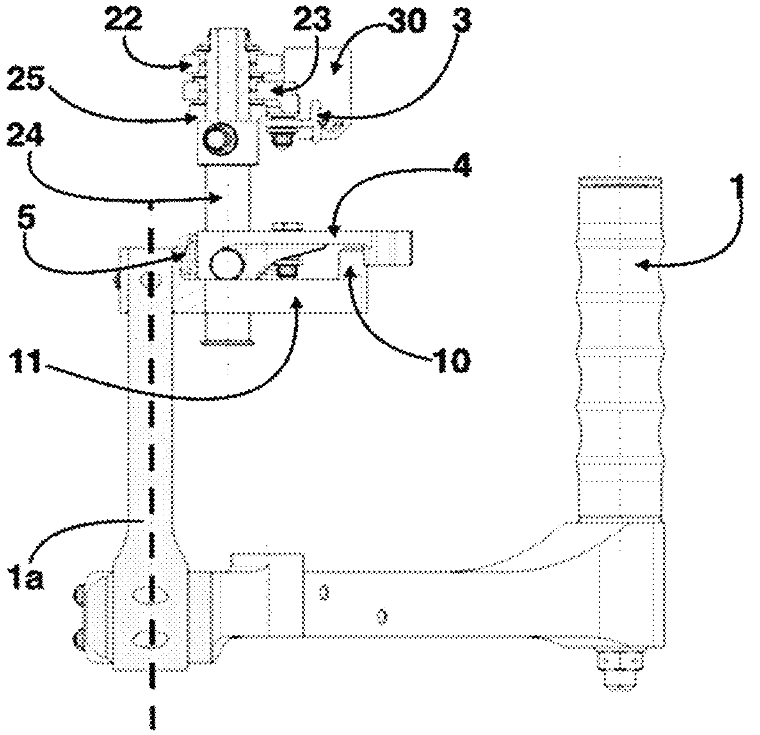
FIG. 3 is a cross-sectional detail view according to AA of the interface in FIG. 1 in the armed position with the actuating handle in the resting position.

In general, and as illustrated by the attached FIGS. 1 and 2, these doors comprise an internal operating handle 1 ensuring, by rotation around an axis 1*a*, the opening of the door, a reserve of electrical energy for safety (not shown) for assistance in the emergency opening of the door and a mechanical interface comprising, in particular, an arming handle 2 movable between a disarmed position (FIGS. 1, 4 and 5) and an armed position (FIGS. 2, 3, 6 and 7 to 10).

Figure 6:
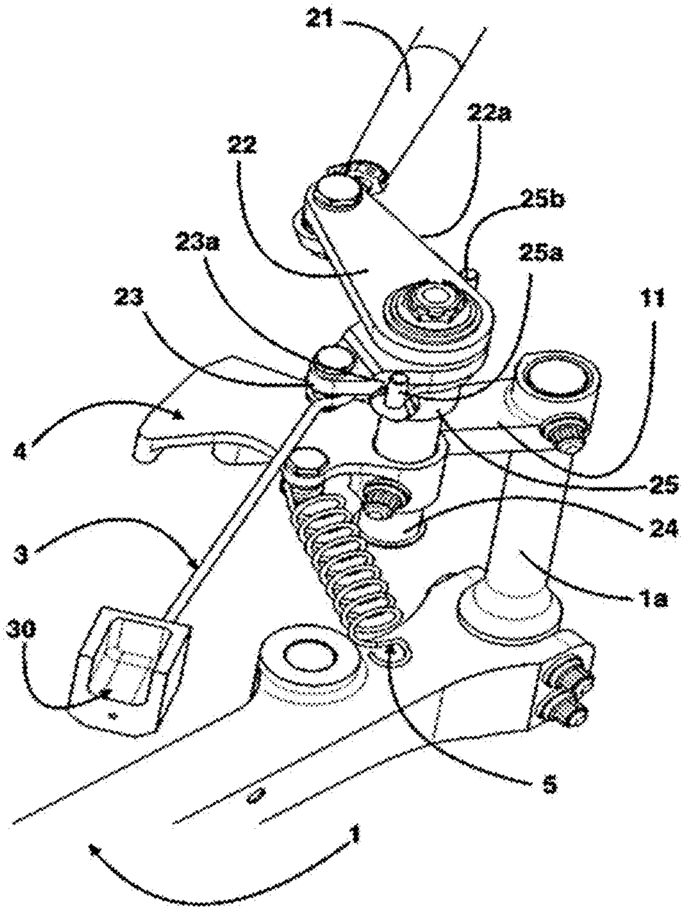
FIG. 6 is a perspective detail view of the interface in FIG. 1 in the armed position with the actuating handle in the resting position.
Figure 7:
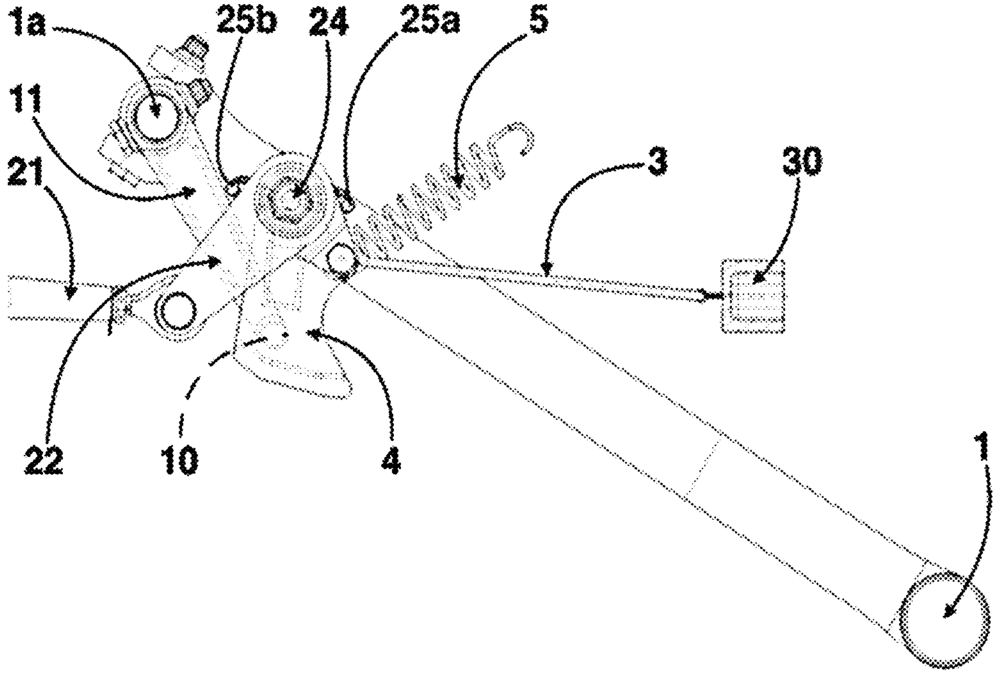
FIG. 7 is a cross-sectional detail view according to BB of the interface in FIG. 1 in the armed position with the actuating handle in the resting position.
Figure 8:
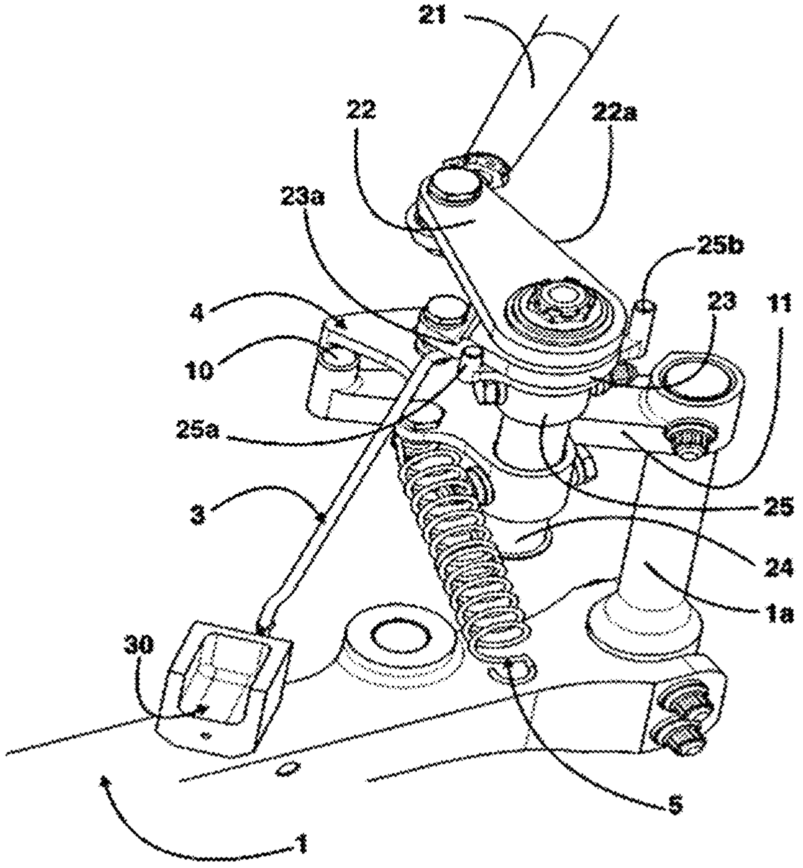
FIG. 8 is a perspective detail view of the interface in FIG. 1 in the armed position with the actuating handle in an intermediate position for activating the safety electrical energy reserve.

The arming handle 2 is connected to the actuating handle 1 via a transmission mechanism which will be described below with reference to both FIGS. 4 and 6 respectively, in the disarmed and armed positions, the handle 1 being then in the resting position and in FIG. 8 in the armed position with the handle moved angularly here by 15°.

The safety system generally includes an electrical power source, and a circuit integrating motors powered by this source and which guarantee an appropriate mechanical power supply, actuators coupled to the motors and intended to guide and move the door according to a pre-established kinematics. If necessary, a pump jointly inflates an evacuation slide from a dedicated system located under the door threshold (these latter components are not shown in the figures because they are not directly concerned by the invention).

The invention consists of integrating a specific mechanical interface ensuring the prior activation of the electrical energy reserve by a simple operation of the inner actuating handle 1 or, where applicable, the outer handle.

Figure 4:
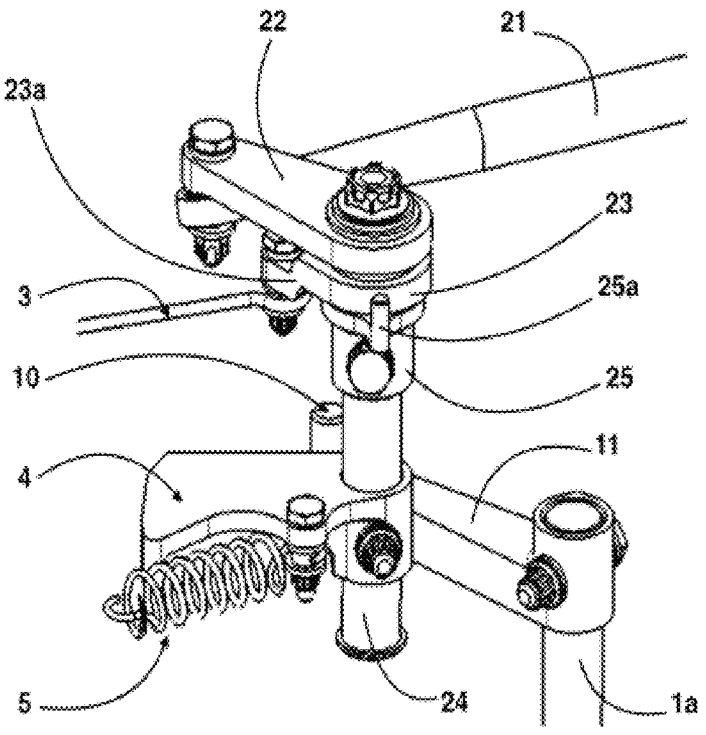
FIG. 4 is a perspective detail view of the interface in FIG. 1 in the disarmed position with the actuating handle in the resting position.
Figure 5:
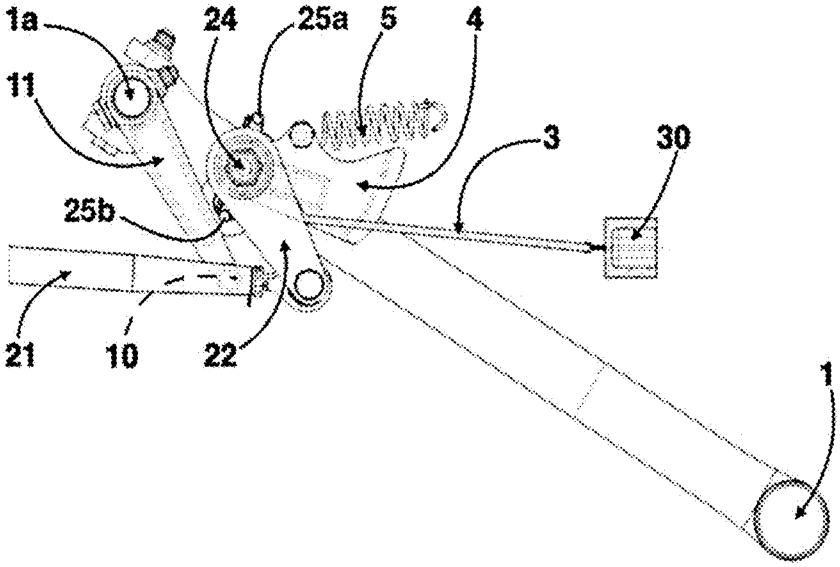
FIG. 5 is a cross-sectional detail view according to BB of the interface in FIG. 1 in the disarmed position with the actuating handle in the resting position.

More precisely, the invention provides that the activation of the electrical safety energy is pre-established, from the armed position of the arming handle 2 (FIGS. 2, 3 and 5), by rotating the inner actuating handle 1 (FIGS. 6 and 7) from its initial resting position corresponding to the locking of the door (FIGS. 1 and 4).

Thus, according to the invention, a predetermined angle value of the inner actuating handle 1 in relation to the closing position ensures that the door is supplied with electrical energy and that the emergency safety system will then be available at the slightest stress.

For this purpose, the interface of the invention comprises a transmission mechanism ensuring the link between the arming handle 2 and the actuating handle 1. This transmission mechanism comprises, respectively, an arm 21, the first end of which is connected to handle 2 by a set of connecting rods 20 (FIG. 1) and which is movable in translation between the disarmed and armed position of handle 2. The second end of the arm 21 is coupled to a first lever 22 mounted in free rotation on a shaft 24 which extends parallel to the axis of rotation of the actuating handle 1.

Below the first lever 22, a second lever 23 is mounted in free rotation on the shaft 24 of the transmission mechanism. This second lever 23 is, on the one hand, connected to a rod 3 ensuring, via an element 30 (FIGS. 6 and 8), the activation of the safety electrical energy reserve and, on the other hand, cooperates with a clutch element 25.

This clutch element 25 is attached to shaft 24 below the second lever 23 and carries two peripheral fingers 25*a*, 25*b* extending diametrically opposite and parallel to shaft 24. The two fingers 25*a*, 25*b* have precise angular positions around the clutch element 25 and cooperate, by rotation of this element 25, alternately, with the second free lever 23 and the first arming lever 22, as described later and illustrated in FIGS. 4, 6 and 8.

In particular, the end of the second lever 23 ensures the grip of the bead 3, while its edge 23*a* ensures the stop by contact with the 25*a* finger during the angular stroke. At the same time, the lateral edge 22*a* of the first lever 22 provides the stop for the 25*b* finger in its angular travel, as shown in FIG. 6.

The first finger 25*a* is thus positioned on the clutch element 25 so as to stop the connecting rod 23 in the armed position of the handle 2, while the second finger 25*b* is positioned on the clutch element 25 so as to come into abutment against the first lever 22 from the disarmed position to the armed position of the arming handle 2 and vice versa, thanks to the action of a return spring 5 which will be described later.

Thus, generally speaking, in the disarmed position (FIG. 4) the finger 25*b* is in contact with the first lever 22 and the finger 25*a* is free. Alternatively, when arming is carried out (FIG. 6), the finger 25*b* is pushed by lever 22 and rotates around the axis of shaft 24 at the same time as the finger 25*a* which then comes into contact with the second lever 23 by exerting a first pull on rod 3 in order to take up any existing clearance.

On shaft 24 and below the second lever 23 is attached, in addition, a cam 4 positioned and coupled to the return spring 5, which is also attached to the structure of the door or any other frame present in the door. In the armed position, shaft 24 and cam 4 rotated under the action of the first lever 22 and the clutch element 25 by energizing spring 5. Conversely, when disarming, the finger 25*b* follows the lever 22 thanks to the pull exerted by the return spring 5 coupled to the cam 4 but which nevertheless remains under tension.

Figure 9:
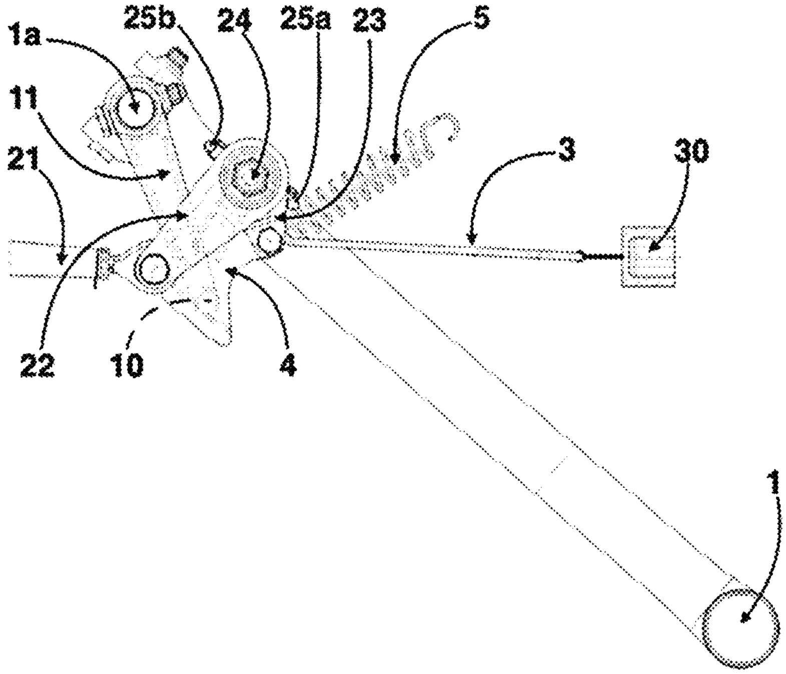
FIG. 9 is a cross-sectional detail view according to BB of the interface in FIG. 1 in the armed position with the actuating handle in an intermediate position for activating the safety electrical energy reserve.
Figure 10:
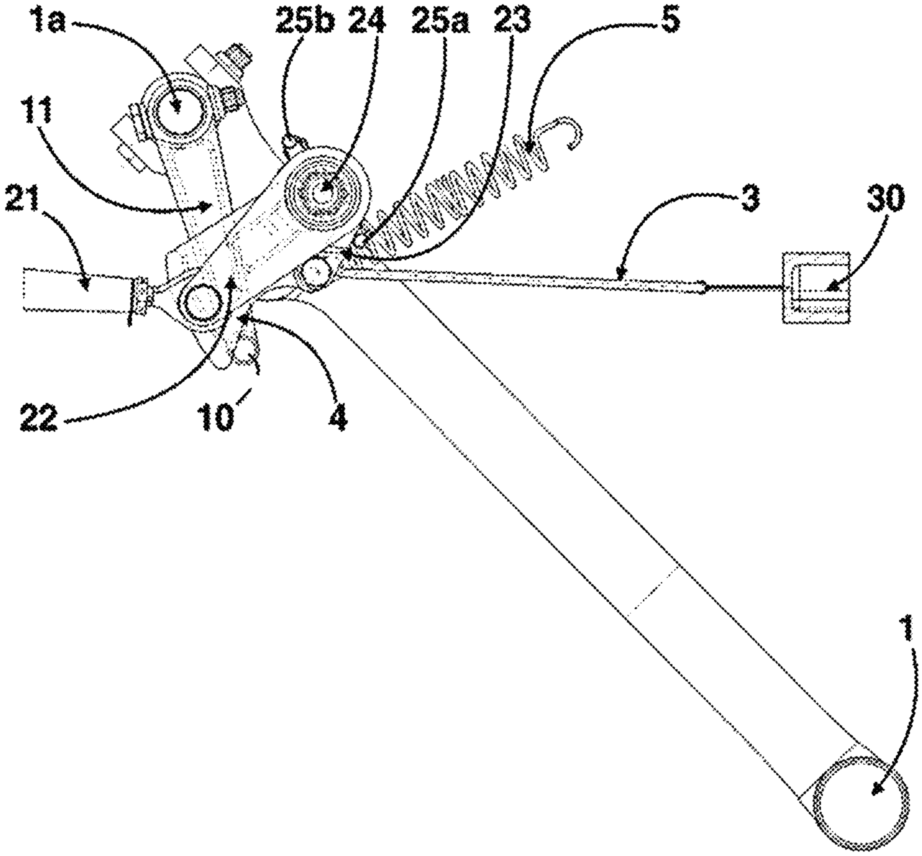
FIG. 10 is a cross-sectional detail view according to BB of the interface in FIG. 1 in the armed position with the actuating handle in the final position of activation of the safety electrical energy.

The interface of the invention provides that the cam 4 of the transmission mechanism cooperates with a drive element 10 carried by the actuating handle 1. The cooperation between cam 4 and this element 10 is carried out in such a way that the second lever 23 rotates under the action of the finger 25*a* when the cam 4, attached to the clutch element 25 via the shaft 24, is driven in rotation by the handle 1, via the drive element 10, and then exerts a second pull on the rod 3 to activate the electrical energy reserve, as illustrated in FIG. 8. FIGS. 9 and 10 illustrate, respectively, an intermediate position (at 9°) and a final position (here at 15°) of the actuating handle 1 corresponding to the activation of the electrical energy reserve.

The drive element 10 is supported by a branch 11 extending transversely to the axis 1*a*. Element 10 is intended to move in a plane parallel to cam 4 in such a way that, in the arming handle 2 position, a rotation of the actuating handle 1 at an angle between 3° and 50° and, preferably, between 10° and 15°, about the axis from its resting position causes, at the same time, a pivot of cam 4 driven by element 10.

According to a specific embodiment of the interface of the invention, the drive element 10 carried by the actuating handle 1 is formed by a pin and the cam 4 is formed by a ramp of L-section disposed opposite the pin. Pion 10 and ramp 4 are positioned in relation to each other so that when handle 2 is in the armed position, the rotation of the actuating handle 1 causes the pin to make contact with the ramp and the ramp to rotate.

In the same way, pin 10 and ramp 4 are positioned in relation to each other so that when arming handle 2 is in the disarmed position (FIG. 4), the rotation of the actuating handle 1 is free and the pin is outside the ramp which, for its part, remains fixed just like the second lever 23 and the rod 3, the safety electrical system is then kept inactive.

The invention claimed is:

1. A mechanical transmission and an interface mechanism between an inner actuating handle (1) providing, by rotation around an axis (1*a*), an opening of an aircraft door and a reserve of electrical energy for assisting an emergency opening of the aircraft door, said interface comprising:
- an arming handle (2) moving between an armed and a disarmed position, the arming handle is coupled to the inner actuating handle (1) by a transmission mechanism, wherein said transmission mechanism comprises:
- a first lever (22) connected, at a first end to the arming handle (2) and at second end to a shaft (24) carrying a second free lever (23) for supporting a rod (3) for activating the safety electrical energy reserve and a clutch element (25) cooperating in rotation with the second lever (23) and the first lever (22) and,
- a cam (4) mounted on said shaft (24) and cooperating with a drive element (10) carried by the actuating handle (1) capable of performing, in the armed position of the arming handle (2), a prior rotation of the actuating handle (1) at an angle between 3° and 50° from its resting position and of driving jointly the rotation of the cam (4), the pivoting of the second lever (23), the translation of the rod (3) and the activation of the electrical energy reserve.

2. The mechanical transmission and interface mechanism according to claim 1, wherein said cam (4) is coupled to a return spring (5) whose tension is increased in the arming position of the handle (2) and decreased in the disarming position.

3. The mechanical transmission and interface mechanism according to claim 1, wherein said first lever (22) is mounted in free rotation on the shaft (24).

4. The mechanical transmission and interface mechanism according to claim 1, wherein said second lever (23) is mounted in free rotation on the shaft (24) between the first lever (22) and the clutch element (25).

5. The mechanical transmission and interface mechanism according to claim 4, wherein the clutch element (25) is attached to the cam (4) via the shaft (24).

6. The mechanical transmission and interface mechanism according to claim 1, wherein the shaft (24) and the axis (1*a*) of the actuating handle (1) are parallel to each other.

7. The mechanical transmission and interface mechanism according to claim 1, wherein said clutch element (25) carries a first finger (25*a*) and a second finger (25*b*), the first finger (25*a*) being driven by the second lever by being positioned so as to come into abutment against the second lever (23) in the position of arming the handle (2).

8. The mechanical transmission and interface mechanism according to claim 7, wherein the second finger (25*b*) is positioned on the clutch element (25) so as to come into abutment against the first lever (22) from the disarmed position to the armed position of the handle (2) and vice versa under the action of the spring (5).

9. The mechanical transmission and interface mechanism according to claim 1, wherein the drive element (10) carried by the actuating handle (1) is formed by a pin and in that said cam (4) is formed by a ramp disposed opposite the pin.

10. The mechanical transmission and interface mechanism according to claim 1, wherein said drive member (10) and said cam (4) are positioned in relation to each other in such a way that when the arming handle (2) is in the armed position, the rotation of the actuating handle (1) causes, via the drive member (10), the joint pivoting of the cam (4) and the second lever (23) via the shaft (24) and the clutch element (25).

11. The mechanical transmission and interface mechanism according to claim 10, wherein said drive member (10) and said cam (4) are positioned in relation to each other in such a way that when the arming handle (2) is in the disarmed position, the rotation of the actuating handle (1) is free and the cam remains fixed.

12. The mechanical transmission and interface mechanism according to claim 1, wherein the arming handle (2) is connected to the first lever (22) by a set of connecting rods (20).

13. An aircraft door provided with at least one handle for operating an opening from an inside or outside and a safety system comprising an electrical power reserve, said door being equipped with a mechanical interface according to claim 1.

* * * * *